United States Patent
Gässler et al.

(10) Patent No.: US 8,881,985 B2
(45) Date of Patent: Nov. 11, 2014

(54) METHOD FOR THE CONCRETIZING OF A SUBSTRATE

(75) Inventors: Joachim Gässler, Donaueschingen (DE); Christian Konz, Ohningen (DE); Harald Richter, Radolfzell (DE)

(73) Assignee: IOSS Intelligente Optische Sensoren & Systeme GmbH, Radolfzell (DE)

( * ) Notice: Subject to any disclaimer, the term of this patent is extended or adjusted under 35 U.S.C. 154(b) by 0 days.

(21) Appl. No.: 13/641,079

(22) PCT Filed: Apr. 13, 2011

(86) PCT No.: PCT/EP2011/001864
§ 371 (c)(1),
(2), (4) Date: Feb. 13, 2013

(87) PCT Pub. No.: WO2011/128089
PCT Pub. Date: Oct. 20, 2011

(65) Prior Publication Data
US 2013/0134222 A1    May 30, 2013

(30) Foreign Application Priority Data

Apr. 14, 2010   (DE) .......................... 10 2010 014 937

(51) Int. Cl.
| | |
|---|---|
| *G06K 5/04* | (2006.01) |
| *G06K 7/10* | (2006.01) |
| *G06K 9/00* | (2006.01) |
| *G06K 7/14* | (2006.01) |

(52) U.S. Cl.
CPC ................ *G06K 7/1491* (2013.01); *G06K 7/14* (2013.01)
USPC ................... 235/462.12; 235/462.01; 235/494

(58) Field of Classification Search
CPC . G06K 7/1419; G06K 7/1417; G06K 7/1443; G06K 19/06046; G06K 19/06037; G06K 7/1473
USPC ................... 235/462.01, 462.08–462.12, 494
See application file for complete search history.

(56) References Cited

U.S. PATENT DOCUMENTS

| | | | | |
|---|---|---|---|---|
| 5,457,308 | A | * | 10/1995 | Spitz et al. ............... 235/462.12 |
| 5,553,084 | A | * | 9/1996 | Ackley et al. ................. 714/752 |
| 6,039,252 | A | * | 3/2000 | Maltsev .................... 235/462.27 |
| 6,572,025 | B1 | * | 6/2003 | Nishikado et al. ............ 235/494 |

(Continued)

FOREIGN PATENT DOCUMENTS

| | | |
|---|---|---|
| DE | 19504912 A1 | 8/1996 |
| DE | 69132985 T2 | 10/2002 |

(Continued)

OTHER PUBLICATIONS

International Search Report, with translation, from PCT Application No. PCT/EP2011/001864 dated Aug. 19, 2011, 5 pages.

*Primary Examiner* — Tuyen K Vo
(74) *Attorney, Agent, or Firm* — Knobbe, Martens, Olson & Bear LLP

(57) ABSTRACT

In a method for concretizing a substrate with a code (1, 2) which is applied at least twice by a code reader, the codes (1, 2) are intended to be assigned or matched to one another, this being suitable for restoring an intact code (1, 2) from at least two codes (1, 2) which are not intact per se.

8 Claims, 3 Drawing Sheets

(56) References Cited

U.S. PATENT DOCUMENTS

| | | | |
|---|---|---|---|
| 7,422,153 B2 * | 9/2008 | Cai | 235/462.01 |
| 2002/0148899 A1 | 10/2002 | Brandt et al. | |
| 2009/0121027 A1 | 5/2009 | Nadabar | |

FOREIGN PATENT DOCUMENTS

| | | |
|---|---|---|
| DE | 10123406 A1 | 11/2002 |
| DE | 10137093 A1 | 2/2003 |
| DE | 69629514 T2 | 2/2004 |
| DE | 102004017504 A1 | 10/2005 |
| DE | 60038636 T2 | 6/2009 |
| EP | 0582911 B1 | 3/1999 |
| EP | 1 207 490 A2 | 5/2002 |
| EP | 1455298 B1 | 10/2005 |
| WO | WO 96/09597 | 3/1996 |
| WO | WO 2004/023209 | 3/2004 |
| WO | WO 2007/099138 | 9/2007 |
| WO | WO 2008/118419 | 10/2008 |
| WO | WO 2011/128089 A1 | 10/2011 |

* cited by examiner

METHOD FOR THE CONCRETIZING OF A SUBSTRATE

The invention pertains to a method, effective in terms of cost and effort, for the concretizing of a substrate according to the main concept of claim 1.

STATE OF THE ART

Known as state of the art, there are various methods for the concretizing of a substrate. In these cases, a code is applied to a substrate. Said code is read by a code reading device. However, the methods known as state of the art do have the disadvantage that, when the code is no longer discernible, said methods are not efficacious any more. The concretizing of a substrate can no longer be carried out and the control or production process related hereto is either incomplete or even needs to be stopped.

From patent literature, methods are known for reading codes where various reading assignments are concerned.

From the German disclosure document DE 10123406A1, a method is known for scanning and establishing of uncertain image regions in an image with one single matrix code.

From the German disclosure document DE 19504912A1, a method is known for scanning and rejoining damaged barcodes.

From the patent document 69132985T2 a scanner is known for reading a barcode on an object. By multiple scanning processes of code fragments of the same code, the code content is reestablished.

From the patent document DE69629514T2, paragraph [0062, 0063] a method is known for reading a data matrix code (DMC) for erroneous or partially covered DMC.

From the PCT document WO07099138A1, a method is known for positioning and producing codes on solar cells.

From the PCT document WO08118419A1, a code reader is known, which only scans a subsection of the code; the code is reconstructed from parts of the code.

From PCT document WO04023209A1, a method is known for reconstructing barcodes, which, given a certain imaging geometry during the process of taking the image, cannot be copied completely as images. Images of parts of codes, which have been taken one after the other, are reconstructed as one code.

From the German disclosure document DE 10137093A1, a method is known for localizing and/or identifying a code in an image context by utilizing a neuronal network.

From the German disclose document DE102004017504A1, a method is known for reconstructing a barcode, in which several images of one code are recorded, which images, each one respectively, contain parts of the barcode.

From Document DE60038636T2, a code reader with a display device is known, which device indicates the completion of a successful decoding process or of an unsuccessful attempt at decoding.

From the European patent document EP1455298A1, a method is known for scanning and decoding damaged barcodes.

From European patent document EP582911A2, a method for localization of codes on a substrate through scanning of a CCD image.

From the patent document US20020148899A1 a method is known for reconstructing a code from code fragments.

From the PCT document WO96009597A1, a method is known for identifying and reconstructing damaged barcodes in an image context.

The known methods for reading and decoding damaged codes by utilizing and image-providing code-reading apparatus or by utilizing codes, which due to their dimensions, cannot be displayed in complete by a given image providing code-reading apparatus, presuppose that, during the reconstruction of a code content, one or several images of one and the same code form the basis. Methods of this kind do, then, lead to a successful reading of a damaged code, if the kind and degree of damage of the code is no graver than it still allows a reconstruction with the aid of suitable algorithms.

OBJECTIVE OF THE INVENTION

It is the objective of the invention to provide a reliable and, in terms of cost and effort, effective method of concretizing a substrate, which allows a reliable output-reading of the code content, even when the code is damaged.

ATTAINMENT OF THE OBJECTIVE

What leads to the attainment of the objective is the characterizing section of claim 1, in which instance, for the description, concepts are used, the meanings of which are described in the following.

The invention pertains to a method for recording and decoding a code upon a substrate by joining together code fragments by utilizing an image providing code reader. Coming into consideration as substrate shall be, in this instance, all materials used in a manufacturing of production process or in any other controlling process of a product. In question as the substrate are, in particular, solar cells, wafers or solar modules.

In industrial manufacturing processes, it is often desirable, if not legally prescribed, to be able to unambiguously identify a product during and also after the manufacturing process. This makes it possible to document the individual manufacturing steps a product has been subjected to, in order to be able to reiterate, after the fact, the individual manufacturing steps. To this end, for example, codes are applied to a product, which during and after completion of the manufacturing process are readable with Said codes can be an array of signs, especially also numerals and letters, which are applied by means of suitable printing techniques of physical or chemical layering methods or are produced by needle printing, drilling, engraving, LASER-engraving, acid etching of the substrate or by material removing or material transforming methods of the like kind. Examples of encodings are one or two dimensional codes (for example barcode, datamatrix-code or QR-codes). These may be applied on to a carrier, for example on to a sticker or label or directly on to the product. If the encodings are applied directly on to the product, component or, generally speaking, the substrate, then codes of this kind are also referred to as "Direct Part Making Codes" or DPM-codes. In the case of a two-dimensional DPM-code, grid-like rectangular or dot-formed openings or the like structures, which are contained within a code, are applied onto the substrate.

In order to read a code on a substrate, that is, to recognize and to decode it, a code-reading device suited to the code needs to be provided. The code-reading device can be directed at the region of the substrate which contains the code, and the code, upon recognition, can be decoded by means of a suitable decoding process of decoding algorithm, in short referred to as "decoder".

If the code is read with an image-providing optical code reader, then the code-carrying substrate is illuminated by means of a suitable illuminating device, and, by means of optical imaging of the substrate on to a transistor image-recorder, a digital image is generated, which is evaluated in an image-processing computer with the aim of decoding.

If it seems probable that the surface structure or changes to the substrate due to conditions of production, for example surface altering processes such as layering, sand blasting, painting or corrosion, have a negative effect on the readability of the encoding, which, prior to said processes, had been applied to the substrate, provision can be made to apply several codes with identical content at various spots of the substrate, preferably within a predetermined region, in order to enhance the probability of the code being read and recognized in reliable manner. In this instance, it is presupposed that one of the codes applied at various spots of the substrate remains readable.

The requirements made on industrial-use optical code readers are manifold and are determined when specifications are made for an optical code reader intended for a specific reading assignment. As examples, some requirements may here be noted:

The reading of codes in various rotating positions in relation to the reading apparatus, as is required, for example, in the case of a hand-held reading, The reading of codes with differing scale measures: for example, in the case of a hand-held reading apparatus due to varying distances between reading apparatus and substrate, The reading of geometrically distorted codes, for example in the case of viewing at askance or viewing of cylindrical or spherical surfaces, Reassembling a code from recognized code fragments, The reading of a code on a substrate, which, in the imaging region of the code reader contains a distorting code, for example a code from an earlier manufacturing step no longer valid, The reading of a code, where the position on the substrate may vary from one substrate to another.

When processing crystalline silicon wafers for the manufacturing of photovoltaic solar cells, for example, a specific code with the same content, at the beginning of the process chain, is multiply applied on to the substrate, in which instance the position of the applied code varies intentionally or coincidentally within a predetermined region of the substrate, because it seems probable that, for example the case of screen printing of contact electrodes a previously written code is covered partially of entirely. By means of multiple application of the code at different locations within a predetermined surface, the probability is enhanced that a complete code is recognized.

In a method according to the invention, a substrate is concretized. Concretizing in this instance implies an individualizing, a making recognizable or recognizing. The process of concretizing, within the context of production, manufacturing and surveillance processes, is becoming ever more necessary, since, apart from legal statutes, consumer preferences also require, in the event, a quick and simple reiteration of the product the product back to the producer. In this context. concretizing also serves purposes of quality surveillance, as well as after-sales-counseling of customers. By means of the concretizing process, it is possible, even after years, to identify a substrate. Identification, as well, is an alternative possibility of concretizing. Identification makes it possible to establish after the event guarantee rights and obligations in an unproblematic manner. In addition, identification makes it possible to continually set and optimize manufacturing processes.

The inventive method refers to a correlation or a comparing of the codes. Correlation or comparing of the codes poses itself in various respects. In detail, this may also imply combining with each other code fragments and/or fragment arrays and/or fragment groups, to compare them or to subject them to a "stitching" process, which means nothing else than that, in the case of a comparison of at least code fragments or fragment arrays or fragment groups of the codes. As colloquial technical term "matching" is generally accepted. From the inventive idea of comparison reconciliation matching is included.

Beneath of that the inventive method is characterized through the fact, that one and the same code is replaced or rotated many times to each other and placed on the substrate. The multiply placed code has the same file content, but could may be vary in his geometrical features (scaling, distortion). At the end, this means nothing else, as the fact, that the codes could placed at different places on the substrate, so that the possibility by comparison of the code fragments or fragment arrays or fragment groups is given to get one readable code. What is advantageous in this instance is the possibility of a highly flexible handling of the individual procedures of the method.

Through the inventive method even such codes can be read, which, taken each one for itself, due the degree of the damage they have undergone, are not decodable.

The term code shall be taken to mean an arrangement of code elements or code modules. The code elements or code modules comprise, all according to the type of code of points, circular surfaces, rectangles or squares, which in their entirety, due to their position and orientation relative to each other, constitute a one or two dimensional code. Examples for codes of this kind are barcodes. data matrix codes ECC200 or the QR-code Code elements or code modules are the smallest data units of a specific code. Their arranging is based on a base grid. In the case of the barcode, this is, for example, the smallest bar or gap width, in the case of the data matrix code, it is the size of the module surface, in the case of a dot matrix type, for example a 5 by 9 grid, it is the size of a single dot, respectively, the edge length of a square circumscribing the dot. Every code element or code module, by means of an image processing procedure, is evaluated, for example, as black or white, set not set, 1 or 0. In the case of distorted or damaged codes it may occur that the image processing does not lead to an unambiguous, binary result. In this case, provision is made for correlating a probability to a code element or a code module. If, for example, they grayness value of a code module or code module lies exactly between black and white, then the value is taken to be unreliable and can be evaluated at a probability for "set" of 0.5

The term code array shall be taken to mean an arrangement of code fragments, which can be identified as belonging to one and the same code. The fact that a code fragment belongs to one and the same code is established by means of the locational relation of the code fragments or by means of other relations of the code fragments among each other, such as, for example, the point in time of recording, substrate velocity during recording or by means of printing regulation. A fragment array may comprise a single code fragment, if, within the evaluated images, no further code fragments of an individual code are determined.

The term fragment group is taken to mean an arrangement, oriented at a base grid, of at least two fragment arrays. A fragment group is formed from the sum of the fragment arrays, on the basis of known image processing and data comparison methods, such as, for example, correlation, pattern comparison or pattern matching, or by means of including characteristic code features, such as, for example, start/stop signs in barcodes, finder patterns, alternating patterns, or other features characteristic of the code.

The method according to the invention features following procedure steps:

(1) From a predetermined evaluation area upon the substrate, aided by the image providing code reading facility, a preliminary digital image and, preferably, several further digital images possessing different illumination or recording parameters, are generated. Initially, the preliminary digital image is processed in an image processing computer.

(2) Within the image processing computer, image regions of the selected image are identified, which contain code fragments of the code sought for. Code fragments of other codes within the digital image are suppressed and the corresponding image regions are for the time being excluded from further image processing, examples being parts of a one dimensional barcode, barcode fragments, two dimensional matrix codes or characters or other structures which are not part of the coding sought after.

(3) The code fragments from step (2), together with data concerning their position, that is, their original reference values (e.g. angular position, coordinates, point in time of recording, etc.) are cached in a memory.

(4) In a first check, the positional data pertaining to the code fragments are compared and a correlation of code fragments with identical codes is carried out.

(5) All code fragments from procedure step (4), which have been correlated to one and the same code, are linked together to one fragment array. The entirety of the code fragments can, as of rule, be correlated to several fragment arrays, in which instance one fragment array can also comprise one single code fragment.

(6) The fragment arrays from procedure step (5) are fed into a decoder. Since error redundant codes (e.g. DataMatrix ECC200) can tolerate a certain degree of damage, partially distorted can be decoded in this procedure step. If the code is recognized, the procedure is completed.

(7) If the code is not decodable, the fragment arrays possessing differing locations are, in a first step, normalized to conform to unified grid measure. The fragment arrays are saved in a buffer, as image data or as symbolic data, binary data or as probabilities of the recognized code elements of code modules, within a memory of the of the image processing computer.

(8) The fragment arrays, which individually and due to the degree of non-restorable damage they have suffered, cannot be evaluated, are now combined, which combining occurs on the basis of known image processing and data comparison methods, such as e.g. correlation, pattern comparison or pattern matching, or by including characteristic code features, such as e.g. start/stop signs in the case of barcodes, finder patterns, alternating patterns, or other features characteristic of the code. In this instance, a-priori data, for example specifications as utilized while writing the code, are used as support. The result of this procedure step is at least one fragment group comprising at least two fragment arrays.

(9) The fragment arrays of procedure step (8) will be directed to the decoder. If the code will be identified, the procedure ends.

(10) The fragment groups from procedure step (2) through to (9) are repeated. in which instance a digital image with varying illumination and recording parameters is used.

(11) The fragment arrays of the first digital image are combined with those of the additionally recorded images, by determining common, overlapping code areas, by means of suitable methods as described in procedure step (8). When the code is recognized, the procedure is completed.

(12) If the code has not been recognized, then probabilities are correlated to the established code elements or code modules, which probabilities have been gleaned from the combinations in procedure step (11), namely, in such a manner that code elements or code modules which, with the same result in different code fragments, have been evaluated and marked with a probability of recognition equaling 1. Code elements or code modules which have been evaluated in different code fragments with varying results, or in the case of which the recognition probability of the code elements or code modules is significantly lesser than 1.0, the latter circumstance implying that the respective code element could not be read in a reliable manner, for example because the grayness value of the code element lay, on a scale from 0 (white) through to 1.0 (black), in the margin between 0.3 and 0.7, are altered for further decoding attempts, that is, the contents of all code elements or code modules having been determined unreliably, are permuted and fed into the decoder until the code has been recognized are permuted until the code has been recognized and fed into the decoder. When the code has been recognized, the procedure is completed.

(13) If the code is not recognized, then an error signal is supplied by the reader facility for further processing in production control.

Special provision is made, within the framework of an embodiment of the invention, for the code being able to be a one dimensional or a two dimensional code and for the substrate possibly being a solar cell consisting of crystalline or amorphous silicon possessing printed traces.

Also, provision is made within the framework of an embodiment of the invention for the code to represent a readable lettering and marking in the form of an OCR-typescript.

Also, provision is made within the framework of an embodiment of the invention that the evaluation area of the substrate may be partially covered and damaged during production steps following the application of the code onto the substrate.

Also, provision is made within the framework of an embodiment of the invention that the code may be applied onto a substrate, which changes with respect to its structure due to aging processes, and said structure may overlay or partially cover the code. Special provision is made to apply the code onto organic surfaces, such as fruit peels, which already before writing the code onto the evaluation area show errors, Further provision is made to utilize the method in accordance with the invention in the case of codes which have been written on to a substrate, for example on to the surface of a catalyser.

BRIEF DESCRIPTION OF THE DRAWINGS

FIG. 1b depicts four code fragments of the two codes of FIG. 1a;

The Invention is explained in more detail with reference to the drawings.

Figure 1A:
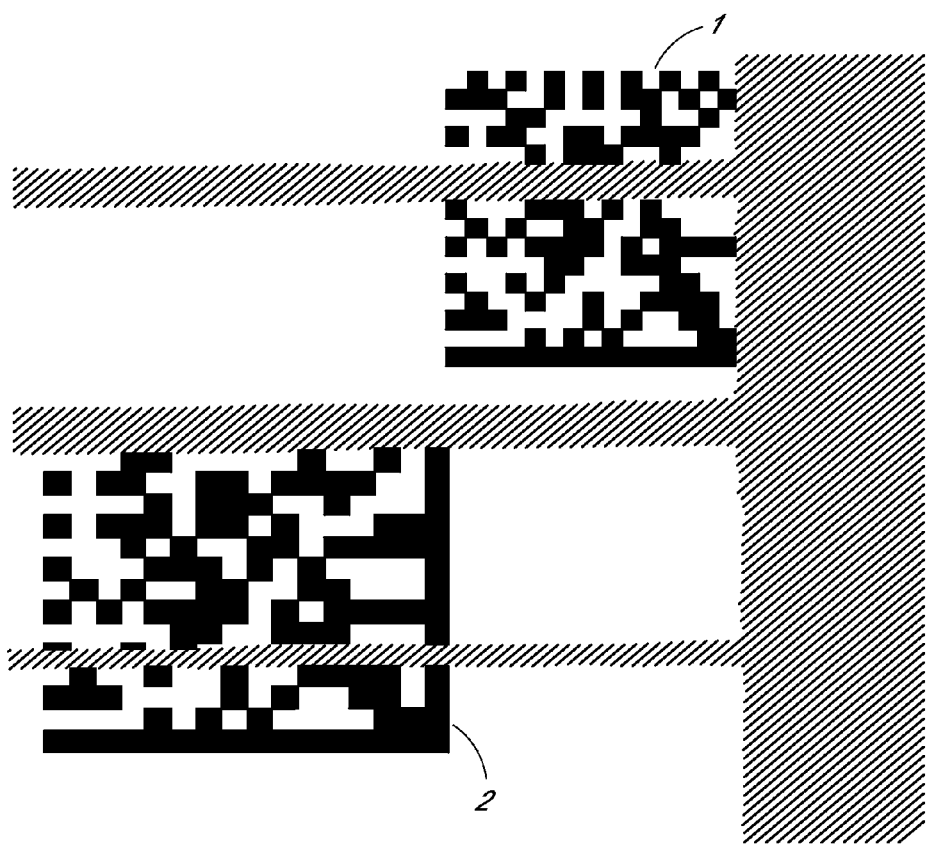
FIG. 1a depicts a digital image of two codes partially covered by alien structures.
Figure 1B:
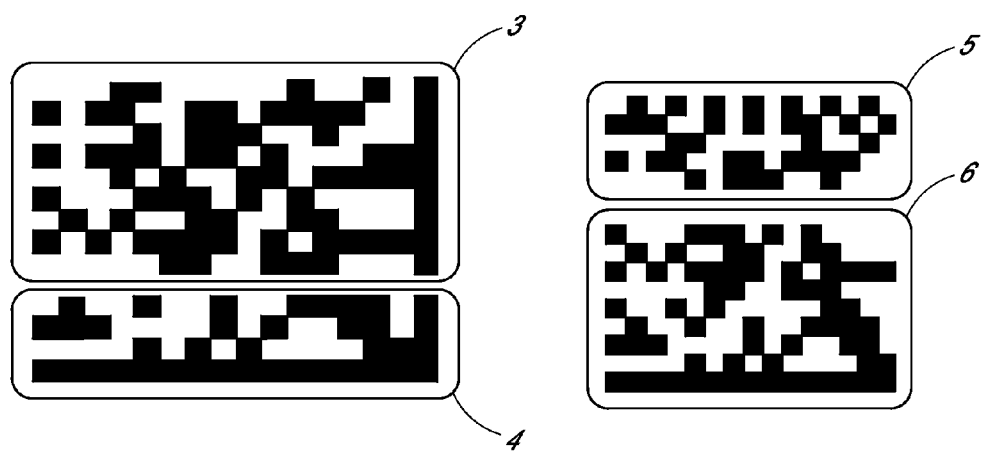

To be seen in FIG. 1a, there is a digital image of two codes 1, 2, partially covered by alien structures, said codes possessing identical content. The alien structures are roughly indicated by hatched areas. Codes 1, 2 are scaled in different manners and, each one on its own, are not decodable, due the degree of the damage they have suffered. In FIG. 1b, four code fragments 3, 4, 5, 6, of the two codes 1, 2 from FIG. 1a are illustrated, which in each respective case are separated by an uninterrupted line. The relative positions and the base grid of the code fragments 3, 4, 5, 6, of one of the codes 1, 2 have been conserved when the codes 1, 2 were separated.

Figure 2A:
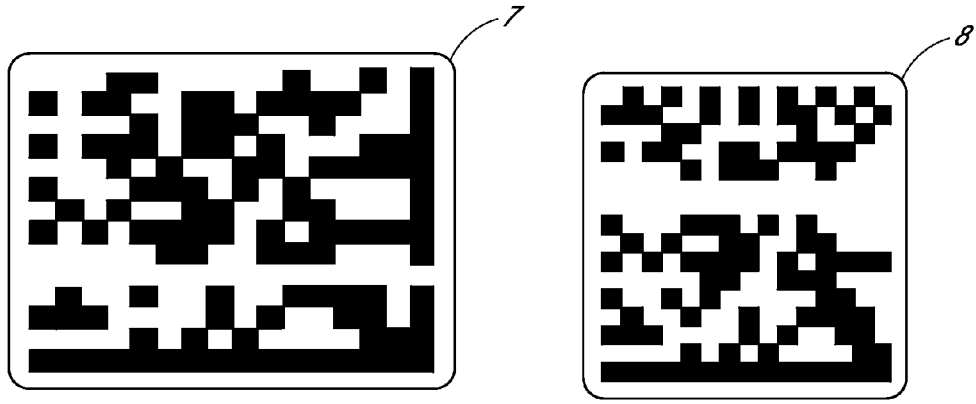
FIG. 2a depicts the four code fragments of FIG. 1b combined to two fragment arrays.
Figure 2B:
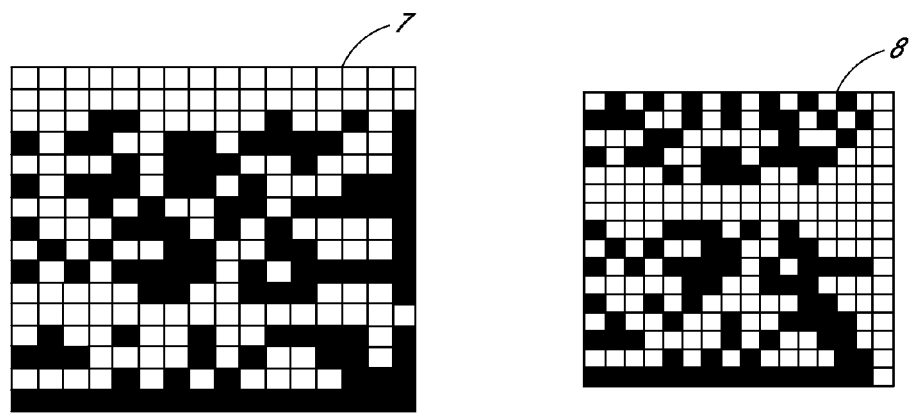
FIG. 2b depicts the two fragments arrays of FIG. 2a having been normalized to conform to a uniform grid measure.
Figure 2C:
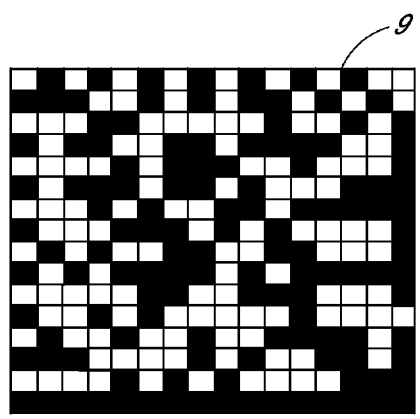
FIG. 2c depicts a fragment group from an array of code elements or code modules joined together from code fragments from FIG. 2b and oriented according to the base grid and normalized.

In FIG. 2a, the four code fragments 3, 4, 5, 6 from FIG. 1b have been combined to two fragment arrays 7, 8. The process of combining has occurred due to given positional data. The two fragment arrays are, in each respective case, indicated by an uninterrupted line. In FIG. 2b, two fragment arrays from FIG. 2a have been illustrated after they have been normalized to conform to a unified grid measure. The data on the individual code elements or code modules can be stored as image data or as symbolic data, for example as binary data in a memory ready for further processing. In FIG. 2c, a fragment group 9 from an array of code elements or code modules is illustrated, which have been joined together from code fragments from FIG. 2b and are oriented according to the base grid and normalized.

Figure 3A:
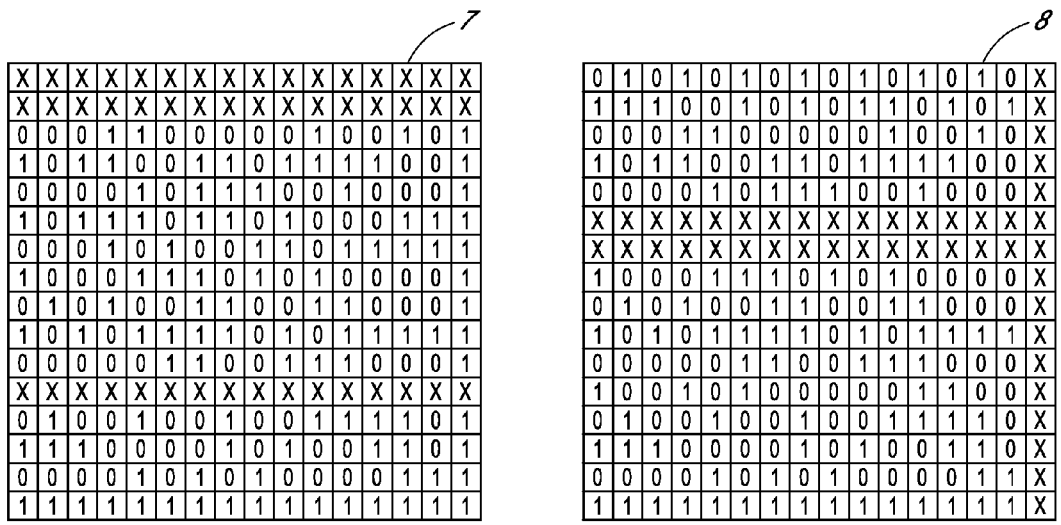
FIG. 3a represents the symbolic data of the code elements of code modules of fragment arrays 7, 8 shown in FIG. 2b.

In FIG. 3a, the code elements of code modules of the two fragment arrays 7, 8 from FIG. 2b are illustrated as symbolic data. Correlated to each code element or code module, there is a numeric value. For a reliably recognized code element or code module a value from 0 through to 1 is entered into the table correlated with the base grid of the code. The code elements or code modules which have not been reliably recognized are indicated by "X" in the tables in FIG. 3a; in the like manner, a probability of 0.5 could be entered into the table.

Figure 3B:
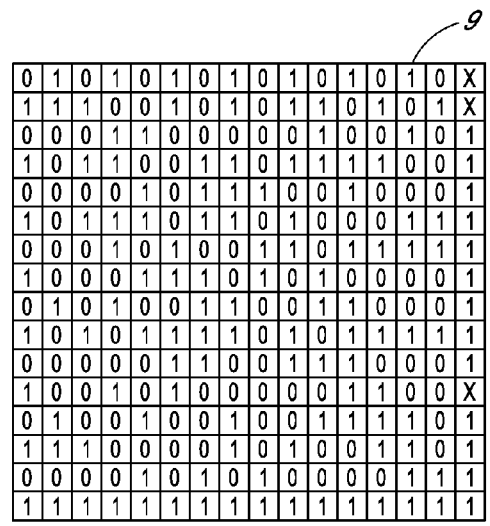
FIG. 3b represents the symbolic data of the code elements of code modules of fragment array 9 shown in FIG. 2c.

The table in FIG. 3b, which represents the fragment group 9 from FIG. 2c, was attained by addition cell by cell of the cell value of the first fragment array 7 and the second fragment array 8, in which instance the results of the addition were transformed according to the rule laid down in table 1.

TABLE 1

| Cell value Fragment array 1 (7) | Cell value Fragment array 2 (8) | Sum . . . | Cell value Fragment group |
|---|---|---|---|
| 0 | 0 | 0 | 0 |
| 1 | 1 | 2 | 1 |
| 1 | X | 1 + X | 1 |
| X | 1 | 1 + X | 1 |
| 0 | X | X | 0 |
| X | 0 | X | 0 |
| X | X | 2X | 0.5 |

In an alternative combining of the code fragments 3, 4, 5, 6 to a code group, in the case of which to the code elements of code modules not recognized in a reliable manner and belonging to code fragments 3, 4. 5, 6 has been correlated a value, lying between 0 and 1, of X=0.5, the transformational rule for the generation of the table of symbolic code elements or code modules of fragment group 9 is illustrated in table 9.

TABLE 2

| Cell value Fragment array 1 (7) | Cell value Fragment array (8) | Sum - - - | Cell value Fragment group |
|---|---|---|---|
| 0 | 0 | 0 | 0 |
| 1 | 1 | 2 | 1 |
| 1 | 0.5 | 1.5 | 1 |
| 0.5 | 1 | 1.5 | 1 |
| 0 | 0.5 | 0.5 | 0 |
| 0.5 | 0 | 0.5 | 0 |
| 0.5 | 0.5 | 1 | 0.5 |

The codes 1, 2 which are applied to the substrate and are to be decoded, can be one or two dimensional codes and the substrate can contain organic, metallic conducting, nonorganic or organic semi-conducting or insulating material and may have faults, which may occur before or after application of the code 1, 2 onto the substrate or exist within the material of the substrate.

An embodiment, in accordance with the invention, of a method for reading a code on a substrate, in which instance the code, within an evaluation area upon a substrate, is represented by at least two fragments and the code fragments in each respective case are correlated with at least two damaged codes, the latter being arranged at different positions within the evaluation area, and comprise code elements arranged on a base grid, in which instance at least one digital image of the evaluation area is generated by means of an image providing code reading device and said at least one digital image is evaluated within an image processing computer possessing several memories and is fed into a decoder for decoding said one code, and in which instance the first image of the evaluation area generated by means of the reading device is entered as input into a first memory of the image processing computer. Subsequently, those image areas of the digital image are identified within the image processing computer, which comprise code fragments like in kind to the code sought for. Code fragments of other kinds of codes within the digital image are suppressed and the corresponding image areas are excluded from further image processing.

Subsequently, the code fragments, together with their positional data within the original digital image are saved in a cache in the second memory of the image processing computer.

Additionally and subsequently, in a first checking step, the positional data of the code fragments are compared and a correlation of code fragments with identical codes is carried out.

Subsequently, all code fragments having been correlated with one and the same code are linked together to at least one fragment array, in which instance the fragment array possesses at least one code fragment.

Subsequently, the fragment arrays are fed into a decoder. If the code is recognized, the procedure is completed.

If this is not the case, the fragments differing as far as location is concerned are initially normalized to conform to a unified grid measure and the normalized fragment arrays are buffer-saved as image data, symbolic data, binary data or as recognition probabilities within a third memory of the image processing computer.

Then the fragment arrays, on the basis of known image processing and data comparison procedures, are combined to fragment groups.

Then the fragment arrays are fed into the decoder. If the code is recognized, the procedure is completed.

If this is not the case, the procedure is repeated with the procedure steps described in the above, in which instance a digital image is used, which possesses illumination or recording parameters different from those of the previously processed digital images.

The fragment groups of the first digital image are combined with those of the further digital images, by assembling the fragment groups at identical, overlapping code areas, upon which the assembled fragment groups are fed into the decoder. If the code is recognized, the procedure is completed.

If not, the established code element are correlated with probabilities, which are gleaned from combinations of fragment groups, namely, in such a manner that code elements, which in different fragment groups have been evaluated at the same result, are accorded a recognition probability of 1, and code elements, which in different fragment groups have been evaluated with different results or in the case of which the recognition probabilities of the code elements were significantly lower than 1.0, are varied for further decoding attempts and the contents of all code elements determined as unreliable are permuted until recognition of the code has been achieved and are fed into the decoder. If the code is recognized, the procedure is completed.

If not, an error signal is provided by the code reading device for further use.

One inventive embodiment of the code in accordance with the invention constitutes a two dimensional code. The substrate, in one embodiment, can be a solar cell made from crystalline silicon with a printed circuit board.

Another inventive embodiment in accordance with the invention constitutes a one dimensional code. The substrate, again, can be a solar cell made from crystalline silicon with a printed conducting circuit.

A code in accordance with the invention possesses a readable lettering and marking in the form of an OCR-typescript, in which instance the substrate can be a solar cell made from crystalline silicon with a printed conducting circuit.

In a method in accordance with the invention the substrate in the evaluation area, prior to application of the code, can possess an irregular or faulty structure and the applied code elements, due to said circumstance, can show partial damage.

By means of the method in accordance with the invention, even such evaluation areas of the substrate, as are covered or damaged in production steps that follow the application of the code onto the substrate, are to be concretized nonetheless.

In another embodiment the code is one that has been generated by means of a laser beam, in which instance the substrate can be a solar cell made from crystalline silicon with a printed conducting circuit.

The substrate can also be a thin layered solar cell.

By means of the method in accordance with the invention, even a code that may be applied to a substrate, which due to aging processes alters its structure, is to be readable, even if said structure also overlays or partially covers the code.

A program in accordance with invention is to be designed in such a manner as to make the computer carry out a procedure in accordance with the kind described in the above, in the event that said procedure runs on a computer, or is downloaded onto a computer.

In addition, a computer program product shall be designed in such a manner that a program, as described in the previous paragraph, is saved and can be activated.

The invention claimed is:

1. A method for concretizing a substrate during a production process, the method comprising:
    applying to the substrate a one- or two-dimensional code with the same file content to at least two different positions within a predetermined evaluation area of the substrate;
    imaging the predetermined evaluation area to obtain an image providing code reading facility;
    identifying image regions within the image which contain code fragments of the one- or two-dimensional code;
    comparing positional data pertaining to the code fragments;
    correlating any code fragments having identical codes;
    linking together any correlated code fragments into a fragment array;
    feeding the fragment array into a decoder; and
    if the one- or two-dimensional code is not decodable, the code fragments of at least two applied and non-decodable codes are correlated or compared with each other to concretize one readable code from the at least two non-decodable codes.

2. The method of claim 1, wherein the one- or two-dimensional codes are correlated to the substrate in an offset, rotated, or scaled manner.

3. The method of claim 1, wherein the decoder compares parts of the image with other parts of the image, and replaces data appearing on one part of the image as code fragments of fragment arrays with data on another part of the image, which also appear as code fragments of fragment arrays, in order to attain one single readable code.

4. The method of claim 3, wherein at least one fragment group, which is formed from code fragments or fragment arrays is fed into the decoder.

5. The method of claim 1, wherein at least a second image of the evaluation area is used with differing illumination or recording parameters.

6. The method of claim 5, wherein the image of the evaluation area is compared with the second image of the evaluation area, and data which appears on the image of the evaluation area as a code fragments or fragment arrays or fragment groups are linked, by data which appears on the second image as code fragments or fragment arrays or fragment groups, to attain one single readable code.

7. The method of claim 5, wherein the code fragments or the fragment arrays or the fragment groups of the image are correlated or compared to the code fragments or the fragment arrays or the fragment groups of the second image by assembling the code fragments or the fragment arrays or the fragment groups at identical, overlapping code areas, subsequently to which the assembled code fragments or the fragment arrays or the fragment groups are fed into the decoder.

8. Tangible, non-transitory memory configured to store a program that when executed by a computer processor is configured to perform operations, the operations comprising the method of claim 1.

* * * * *